(12) United States Patent
Ryu et al.

(10) Patent No.: US 12,445,973 B2
(45) Date of Patent: Oct. 14, 2025

(54) ELECTRONIC DEVICE FOR ADJUSTING PARAMETER FOR DRIVING OF GRIP SENSOR AND METHOD THEREOF

(71) Applicant: SAMSUNG ELECTRONICS CO., LTD., Suwon-si (KR)

(72) Inventors: Wansang Ryu, Suwon-si (KR); Hoseop Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 410 days.

(21) Appl. No.: 18/120,035

(22) Filed: Mar. 10, 2023

(65) Prior Publication Data

US 2023/0403658 A1 Dec. 14, 2023

Related U.S. Application Data

(63) Continuation of application No. PCT/KR2023/003096, filed on Mar. 7, 2023.

(30) Foreign Application Priority Data

Jun. 14, 2022 (KR) .................. 10-2022-0072459
Jul. 7, 2022 (KR) .................. 10-2022-0084040

(51) Int. Cl.
*H04W 52/28* (2009.01)
*G01D 5/24* (2006.01)
*H04M 1/72454* (2021.01)

(52) U.S. Cl.
CPC ........... *H04W 52/288* (2013.01); *G01D 5/24* (2013.01); *H04M 1/72454* (2021.01)

(58) Field of Classification Search
CPC ... H04W 52/288; G01D 5/24; H04M 1/72454
See application file for complete search history.

(56) References Cited

U.S. PATENT DOCUMENTS 9,979,390 B2 5/2018 Fujikawa et al.
10,222,269 B2 3/2019 Park et al.
(Continued)

FOREIGN PATENT DOCUMENTS

CN 113535009 A 10/2021
JP 5816827 B1 11/2015
(Continued)

OTHER PUBLICATIONS

Myllymaki S, Huttunen A, Palukuru VK, Jantunen H, Berg M, Salonen ET. Capacitive recognition of the users hand grip position in mobile handsets. Progress in Electromagnetics Research B. 2010;22:203-20. (Year: 2010).*

(Continued)

*Primary Examiner* — Fayyaz Alam
(74) *Attorney, Agent, or Firm* — CANTOR COLBURN LLP

(57) ABSTRACT

An electronic device includes a grip sensor which detects a grip on the electronic device, and a communication circuitry operably coupled to the grip sensor. The grip sensor is configured to transmit a signal indicating whether the grip is detected, to the communication circuitry in a first state for detecting the grip, based on a capacitance changed by the grip and a reference capacitance. The grip sensor is configured to adjust the reference capacitance based on the capacitance in a second state, which is different from the first state, for adjusting the reference capacitance. The grip sensor is configured to adjust the reference capacitance to be lower than a preset threshold, based on identifying that the reference capacitance is adjusted to be greater than or equal to the preset threshold.

20 Claims, 11 Drawing Sheets

(56) References Cited

U.S. PATENT DOCUMENTS

| | | | |
|---|---|---|---|
| 10,782,827 B2 | 9/2020 | Seo et al. | |
| 10,884,152 B2 | 1/2021 | Min et al. | |
| 11,201,635 B2 | 12/2021 | Chu et al. | |
| 11,429,234 B2 | 8/2022 | Lee et al. | |
| 11,467,700 B2 | 10/2022 | Imai et al. | |
| 11,499,844 B2 | 11/2022 | Seo et al. | |
| 11,994,928 B1* | 5/2024 | Alameh | B62B 5/00 |
| 2012/0214422 A1* | 8/2012 | Shi | H04W 52/18 |
| | | | 455/67.11 |
| 2014/0333581 A1* | 11/2014 | Cormier, Jr. | G06F 1/3265 |
| | | | 345/174 |
| 2015/0162932 A1* | 6/2015 | Page | G06F 3/04883 |
| | | | 341/163 |
| 2015/0237183 A1* | 8/2015 | Novet | H04M 1/72454 |
| | | | 455/556.1 |
| 2016/0076952 A1* | 3/2016 | Kim | G06F 1/1626 |
| | | | 345/173 |
| 2021/0377384 A1 | 12/2021 | Alameh et al. | |
| 2022/0039025 A1 | 2/2022 | Zhang et al. | |
| 2022/0285825 A1* | 9/2022 | Lee | H01Q 1/243 |
| 2023/0129250 A1* | 4/2023 | Sung | H04M 1/72454 |

FOREIGN PATENT DOCUMENTS

| | | | |
|---|---|---|---|
| JP | 2022002169 A | 1/2022 | |
| JP | 7420374 B2 | 1/2024 | |
| KR | 20160121058 A | 10/2016 | |
| KR | 20190050536 A | 5/2019 | |
| KR | 20200049391 A | 5/2020 | |
| KR | 1020200101265 A | 8/2020 | |
| KR | 102194971 B1 | 12/2020 | |
| KR | 1020210033842 A | 3/2021 | |
| KR | 102252572 B1 | 5/2021 | |
| KR | 102276144 B1 | 7/2021 | |

OTHER PUBLICATIONS

International Search Report and Written Opinion mailed Jun. 8, 2023 for PCT/KR2023/003096.

* cited by examiner

ELECTRONIC DEVICE FOR ADJUSTING PARAMETER FOR DRIVING OF GRIP SENSOR AND METHOD THEREOF

CROSS-REFERENCE TO RELATED APPLICATION(S)

This application is a continuation of PCT International Application No. PCT/KR2023/003096, which was filed on Mar. 7, 2023, and claims priority to Korean Patent Application No. 10-2022-0084040, filed on Jul. 7, 2022, and claims priority to Korean Patent Application No. 10-2022-0072459, filed on Jun. 14, 2022, in the Korean Intellectual Property Office, the disclosure of which are incorporated by reference herein their entirety.

BACKGROUND

Technical Field

Embodiments of the disclosure relate to an electronic device and a method for controlling a grip sensor in the electronic device by adjusting a parameter.

Description of Related Art

An electronic device supporting wireless communication are being developed. The electronic device may change a strength of a signal wirelessly transmitted from the electronic device while performing wireless communication, based on a standard related to specific absorption rate (SAR). For example, the electronic device may change the strength of the signal based on a distance between the electronic device and a user. The electronic device may include one or more sensors for measuring the distance or identifying the user.

SUMMARY

According to an embodiment, an electronic device may comprise a grip sensor which detects a grip on the electronic device, and a communication circuitry operably coupled to the grip sensor. The grip sensor may be configured to transmit a signal indicating whether the grip is detected to the communication circuitry in a first state for detecting the grip, based on a capacitance changed by the grip and a reference capacitance. The grip sensor may be configured to adjust the reference capacitance based on the capacitance in a second state, which is different from the first state, for adjusting the reference capacitance. The grip sensor may be configured to adjust the reference capacitance to be lower than a preset threshold, based on identifying that the reference capacitance is adjusted to be greater than or equal to the preset threshold.

According to an embodiment, a method for controlling a grip sensor in an electronic device may comprise detecting the grip based on a capacitance adjusted by the grip and a reference capacitance, in a first state for detecting a grip on the electronic device. The method may comprise adjusting the reference capacitance based on the capacitance within a second state, which is different from the first state, for adjusting the reference capacitance. The method may comprise adjusting the reference capacitance to be lower than a preset threshold, based on identifying that the reference capacitance is adjusted to be greater than or equal to the preset threshold.

According to an embodiment, an electronic device may comprise a grip sensor which detects a grip on the electronic device, an antenna, and a communication circuitry which adjusts a strength of a wireless signal transmit by the antenna based on the grip detected by the grip sensor. The grip sensor may be configured to detect the grip by comparing a capacitance changed by an external object different from the electronic device to a reference capacitance adjusted based on a preset period. The grip sensor may be configured to adjust the reference capacitance based on the capacitance in a preset range associated with the reference capacitance, while adjusting the reference capacitance based on the preset period.

DETAILED DESCRIPTION

Figure 1:
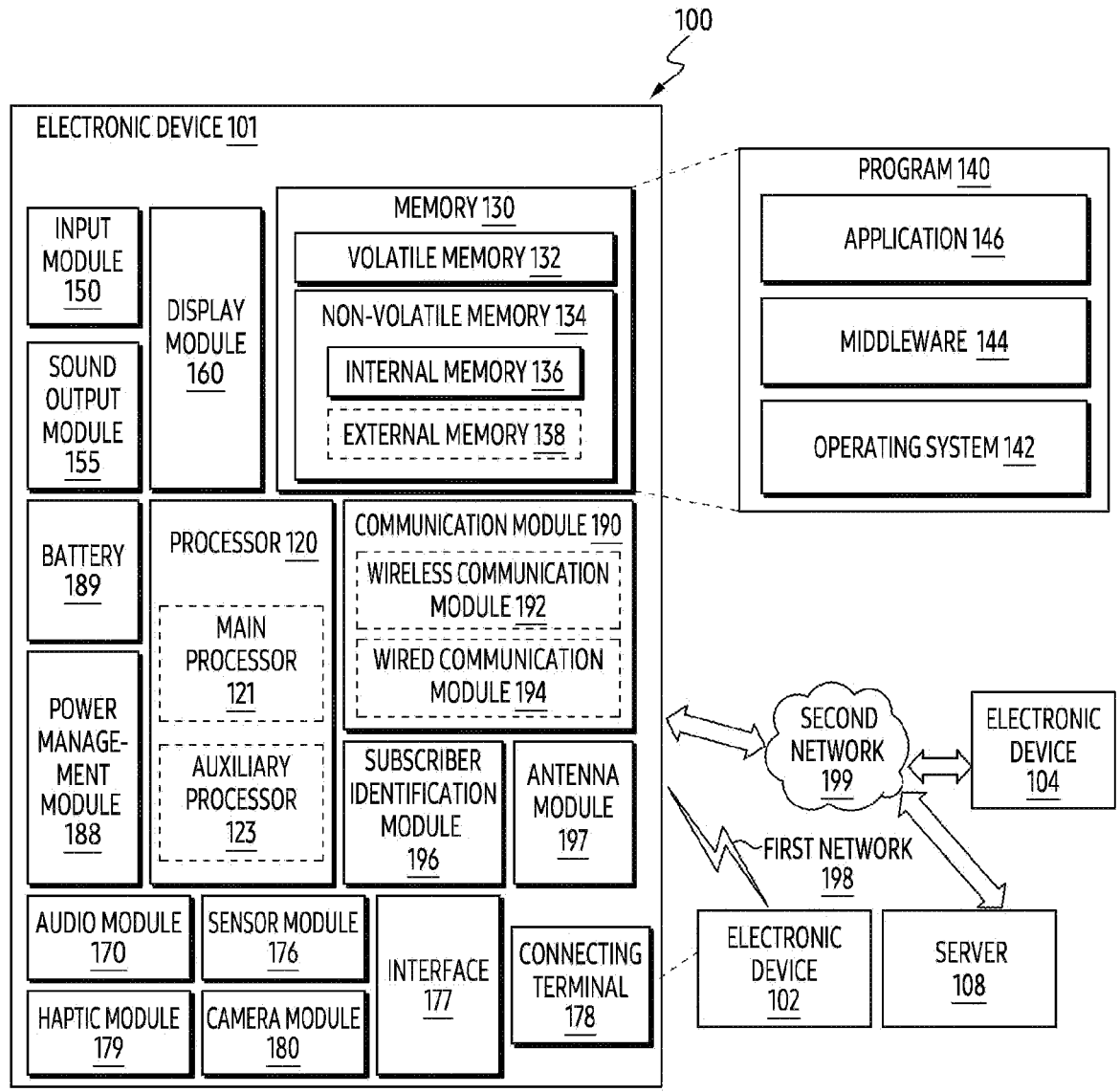
FIG. 1 is a block diagram illustrating an electronic device 101 in a network environment 100 according to various embodiments.

Hereinafter, various embodiments of the present disclosure will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. A singular form of the noun corresponding to the item may include one or more of the items unless clearly indicated differently in a related context. As used herein, each of the phrases such as "A or B", "at least one selected from A and B", "at least one of A and B", "at least one of A, B and C", "at least one of A, B, or C", "at least one selected from A, B and C and "at least one of A, B, and C" may include any one of the phrases together, or all possible combinations thereof. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
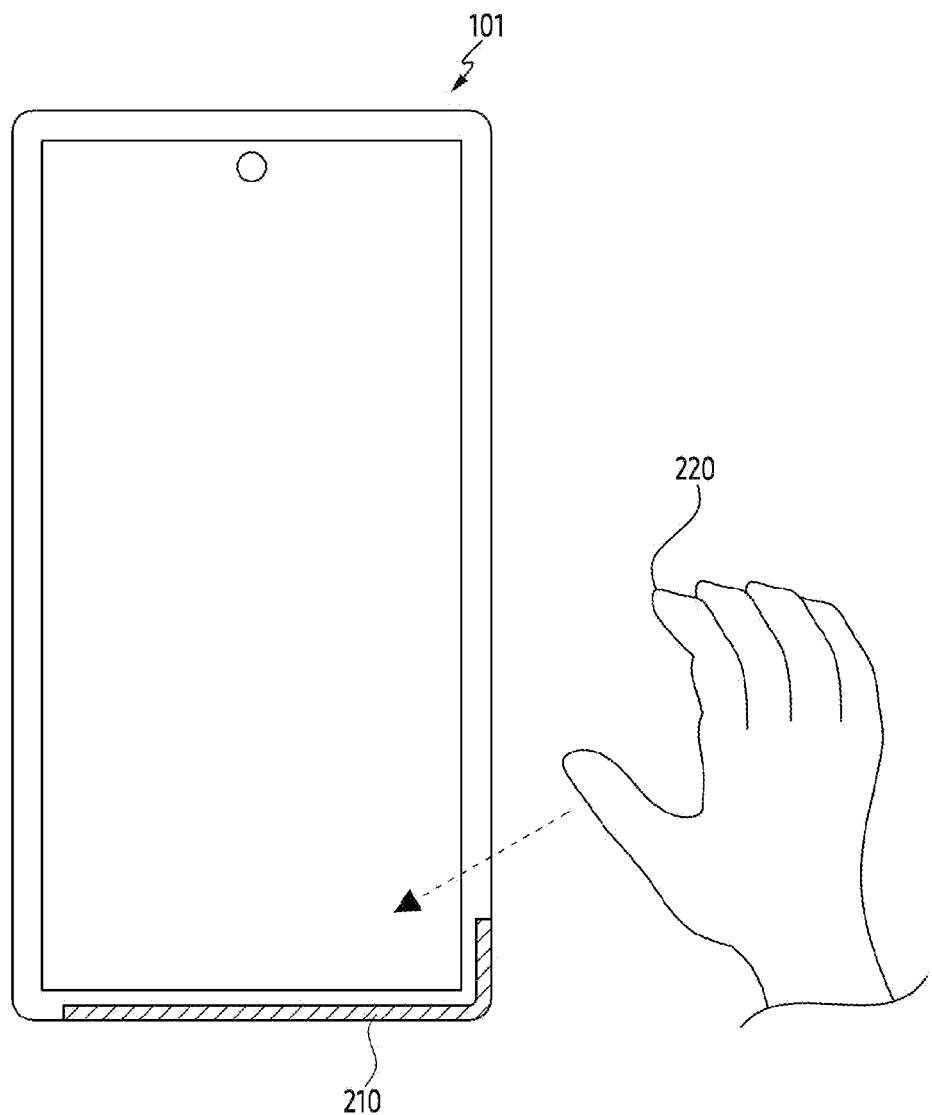
FIG. 2 is a plan view illustrating an operation of an electronic device for identifying an external object based on a grip sensor, according to an embodiment.

FIG. 2 is a plan view illustrating an operation in which the electronic device 101 identifies the external object 220 based on the grip sensor, according to an embodiment. The electronic device 101 of FIG. 2 may include the electronic device 101 of FIG. 1. According to an embodiment, the electronic device 101 may be a terminal owned by a user. For example, the terminal may include a personal computer (PC) such as a laptop and a desktop, a smartphone, a smart pad, a tablet PC, or smart accessories such as a smartwatch and a head-mounted device (HMD).

According to an embodiment, the electronic device 101 may include an antenna for wirelessly transmitting or receiving a signal. Referring to FIG. 2, an embodiment of the electronic device 101 including an antenna pattern 210 formed on at least a part of another surface (e.g., a side surface) different from one surface (e.g., the front surface) of the electronic device 101 on which the display is disposed is illustrated. According to an embodiment, the electronic device 101 may wirelessly transmit a signal using an antenna such as the antenna pattern 210. Wirelessly transmitting a signal by the electronic device 101 may include outputting electromagnetic waves to an external space by the electronic device 101. The electromagnetic wave (or signal) output from the electronic device 101 may be propagated to the external object 220 existing in the external space.

Referring to FIG. 2, an external object 220 such as a user's hand is illustrated. According to an embodiment, the electronic device 101 may reduce the strength of electromagnetic waves and/or signals to reduce electromagnetic waves absorbed by the external object 220 such as a hand. The strength may be referred to as a power of a signal wirelessly transmitted by the electronic device 101. According to an embodiment, the electronic device 101 may change the strength of a signal wirelessly output through the antenna pattern 210 based on whether the external object 220 adjacent to the electronic device 101 is detected. For example, in response to identifying an external object 220 that is in contact with the electronic device 101 or exists within a preset distance from the electronic device 101, the electronic device 101 may reduce the strength of a signal output from the antenna based on a standard related to a specific absorption rate (SAR). In an embodiment, the electronic device 101 may increase the strength of the signal output from the antenna independently of the standard, based on the failure to identify the external object 220 adjacent to the electronic device 101.

According to an embodiment, the electronic device 101 may include a sensor for detecting the external object 220. For example, the electronic device 101 may include a sensor for detecting an external object 220 approaching the antenna of electronic device 101 such as the antenna pattern 210. The electronic device 101 may determine whether to reduce the strength of the signal wirelessly output through the antenna to less than the preset strength defined by the SAR, based on detecting the external object 220 approaching the antenna based on the sensor.

According to an embodiment, the electronic device 101 may include a grip sensor that is a sensor for detecting the external object 220 and detects the external object 220 based on an electric field formed in an external space adjacent to the electronic device 101. In an embodiment, the grip sensor may include a capacitive element such as a capacitor to form the electric field. In an embodiment, the electronic device 101 according to an embodiment may identify the external object 220 based on a change in capacitance of the capacitor in the grip sensor caused by the electric field. For example, the electronic device 101 may use the grip sensor to identify the external object 220 in contact with or adjacent to the electronic device 101. For example, the electronic device 101 may detect a grip on the electronic device 101 by the external object 220 using the grip sensor. The electronic device 101 may reduce the strength of a signal transmitted wirelessly to less than or equal to a threshold strength (e.g., a threshold strength set by SAR), based on detecting the external object 220 in contact with or adjacent to the electronic device 101. The electronic device 101 may increase the strength of the signal to be greater than or equal to the threshold strength, based on detecting the release of the grip (or movement of the external object 220 getting or being away from the electronic device 101 beyond the preset distance). A structure of hardware connected to the grip sensor in the electronic device 101 according to an embodiment will be described with reference to FIG. 3.

According to an embodiment, the grip sensor of the electronic device 101 may compare a capacitance changed by an electric field formed in an external space with a reference capacitance that is a parameter controlled by the grip sensor. Although an embodiment in which an external object 220 such as a hand is disposed in an external space is illustrated in FIG. 2, the number and/or type of external objects in the external space is not limited to the embodiment. According to an embodiment, the electronic device 101 may adjust the reference capacitance based on the capacitance changed by the external space including the external object 220. For example, the electronic device 101 may change the reference capacitance to identify the change more accurately in capacitance by the external object 220 in contact with the electronic device 101 among the changes in capacitance due to various factors of the external space. While adjusting the reference capacitance based on the capacitance, the electronic device 101 may adjust a range in which the reference capacitance is adjusted, or may limit a maximum value of the reference capacitance to exclude a change in capacitance due to contact between the electronic device 101 and the external object 220. Since the electronic device 101 restrictively adjusts the reference capacitance, which is a parameter of the grip sensor, the electronic device 101 may more accurately identify the external object 220 adjacent to the electronic device 101 based on the capacitance measured by the grip sensor.

As described above, the electronic device 101 according to an embodiment may wirelessly transmit a signal using an antenna such as the antenna pattern 210. The electronic device 101 may adjust the strength and/or power of the wirelessly transmitted signal based on detecting the external object 220. The electronic device 101 may include a sensor (e.g., a grip sensor) for identifying the external object 220. The electronic device 101 may obtain capacitance that is related to an electric field formed based on a grip sensor and is changed by the external object 220. The electronic device 101 may detect the external object 220 by comparing the reference capacitance stored in the grip sensor with the capacitance. According to an embodiment, the electronic device 101 may adjust the reference capacitance based on a change in capacitance according to a change in an external space including the external object 220. The electronic device 101 may improve the accuracy of identification of the external object 220 by comparing the reference capacitance and the reference capacitance by preventing a rapid change in the reference capacitance while adjusting the reference capacitance.

Hereinafter, referring to FIG. 3, an embodiment of the electronic device 101 for more accurately identifying the external object 220 using a grip sensor will be described.

Figure 3:
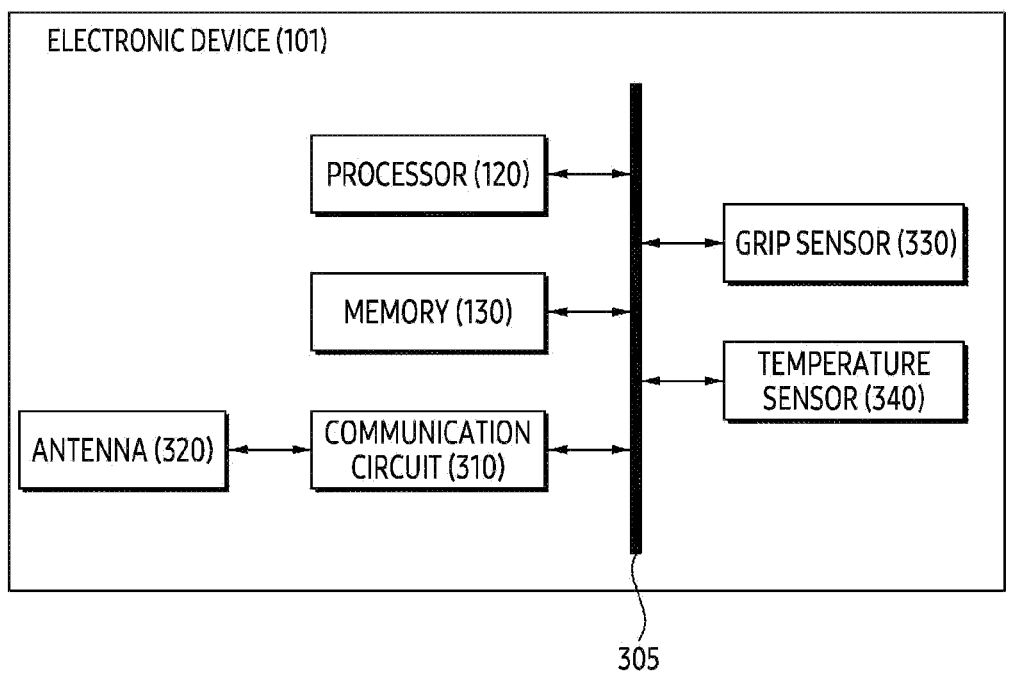
FIG. 3 is a block diagram illustrating an embodiment of an electronic device including a grip sensor.

FIG. 3 is a block diagram illustrating an embodiment of an electronic device 101 including a grip sensor 330. The electronic device 101 of FIG. 3 may include the electronic device 101 of FIGS. 1 to 2.

Referring to FIG. 3, according to an embodiment, the electronic device 101 may include at least one of a processor 120, a memory 130, a communication circuit 310, an antenna 320, a grip sensor 330, or a temperature sensor 340. The processor 120, the memory 130, the communication circuit 310, the antenna 320, the grip sensor 330, and the temperature sensor 340 may be electrically and/or operably coupled with each other by an electronic component such as a communication bus 305. Although components of the electronic device 101 are illustrated based on different blocks in FIG. 3, the embodiment is not limited thereto, and some of the hardware components (e.g., at least a part of the processor 120, memory 130, and communication circuit 310) illustrated in FIG. 3 may be included in a single integrated circuit such as a system on a chip (SoC). The type and/or number of hardware components included in the electronic device 101 are not limited as illustrated in FIG. 3. For example, the electronic device 101 may include only a part of the hardware components illustrated in FIG. 3.

The processor 120 of electronic device 101 according to an embodiment may include a hardware component for processing data based on one or more instructions. For example, hardware components for processing data may include an arithmetic and logic unit (ALU), a floating point unit (FPU), a field programmable gate array (FPGA), and/or a central processing unit (CPU). The number of the processor 120 may be one or greater. For example, the processor 120 may have a structure of a multi-core processor such as a dual core, a quad core, or a hexa core. The processor 120 of FIG. 3 may include the processor 120 of FIG. 1.

According to an embodiment, the memory 130 of the electronic device 101 may include a hardware component for storing data and/or instructions input and/or output to the processor 120. For example, the memory 130 may include volatile memory such as random-access memory (RAM) and/or non-volatile memory such as read-only memory (ROM). For example, the volatile memory may include at least one of dynamic RAM (DRAM), static RAM (SRAM), cache RAM, or pseudo SRAM (PSRAM). For example, the nonvolatile memory may include at least one of a programmable ROM (PROM), an erasable PROM (EPROM), an electrically erasable PROM (EEPROM), a flash memory, a hard disk, a compact disk, or an embedded multi-media card (eMMC). The memory 130 of FIG. 3 may include the memory 130 of FIG. 1.

In an embodiment, one or more instructions indicating a calculation and/or an operation to be performed on data by processor 120 may be stored in the memory 130. A set of one or more instructions may be referred to as firmware, operating system, process, routine, sub-routine, and/or application. For example, the electronic device 101 and/or the processor 120 may execute a set of a plurality of instructions stored in the memory 130 and distributed in the form of an operating system, firmware, drivers, and/or applications.

According to an embodiment, the communication circuit 310 of the electronic device 101 may include a hardware component for supporting transmission and/or reception of electrical signals between the electronic device 101 and external electronic devices. For example, the communication circuit 310 may include at least one of a MODEM, an antenna, or an optic/electronic (O/E) converter. The communication circuit 310 may support transmission and/or reception of electrical signals based on various types of protocols such as Ethernet, local area network (LAN), wide area network (WAN), wireless fidelity (WiFi), Bluetooth, bluetooth low energy (BLE), ZigBee, long term evolution (LTE), 5G new radio (NR), and/or 6G mobile communication. The communication circuit 310 of FIG. 3 may include at least a part of the communication module 190 of FIG. 1.

According to an embodiment, the antenna 320 of the electronic device 101 may be controlled by the communication circuit 310 to support wireless communication between the electronic device 101 and the external electronic device. For example, the antenna 320 may include a conductive pattern, e.g., the antenna pattern 210 of FIG. 2, formed on one surface of the housing of the electronic device 101. In such an embodiment, the frequency band accessible to the electronic device 101 based on the communication circuit 310 may be adjusted by the length and/or shape of the conductive pattern. The antenna 320 included in the electronic device 101 is not limited thereto, and the antenna 320 may include, for example, a conductive pattern formed on a printed circuit board (PCB) included in the electronic device 101. The number of the antenna 320 included in the electronic device 101 is not limited to an embodiment of FIG. 3.

According to an embodiment, the electronic device 101 may include a sensor for generating electrical information that can be processed by the processor 120 and/or the memory 130 from non-electronic information related to the electronic device 101. Referring to FIG. 3, as examples of sensors included in the electronic device 101, a grip sensor 330 and a temperature sensor 340 are illustrated. Although an embodiment of the electronic device 101 including the grip sensor 330 and the temperature sensor 340 is illustrated in FIG. 3, the embodiment is not limited thereto. For example, the electronic device 101 may include a grip sensor 330 among the grip sensor 330 and the temperature sensor 340. Although the grip sensor 330 and the temperature sensor 340 are illustrated separately in FIG. 3, the temperature sensor 340 may be integrated in the grip sensor 330, according to an embodiment.

According to an embodiment, the grip sensor 330 in the electronic device 101 may identify an external object in contact with or adjacent to the electronic device 101. For example, the grip sensor 330 may detect a grip on the housing of the electronic device 101 by the external object and a release of the grip. The grip may be generated by an external object (e.g., the external object 220 of FIG. 2) in contact with the housing. As described above with reference to FIG. 2, according to an embodiment, the grip sensor 330 in the electronic device 101 may identify the grip and/or the release of the grip based on an electric field formed based on a capacitive element such as a capacitor therein. The grip sensor 330 according to an embodiment may identify a dependent capacitance depending on the electric field. Based on the capacitance, the grip sensor 330 in the electronic device 101 may identify the grip on the electronic device 101 or the approach of the external object.

According to an embodiment, the grip sensor 330 may identify an external object that is in contact with or adjacent to electronic device 101, based on the capacitance and the reference capacitance depending on the electric field formed in the outer space of the electronic device 101. For example, the grip sensor 330 may identify a grip on the electronic device 101 by an external object or an approach of an external object based on the difference between the capacitance and the reference capacitance. The reference capacitance may be a parameter stored in the electronic device 101 and/or the grip sensor 330. The reference capacitance may be adjusted based on a preset event related to the grip sensor 330. The preset event may be referred to as a reset of grip sensor 330. A state in which the grip sensor 330 identifies a grip on the electronic device 101 by an external object or identifies an approach of the external object based on capacitance and reference capacitance may be referred to as a first state. A state in which the reference capacitance is adjusted based on the reset of the grip sensor 330 may be referred to as a second state.

In the second state in which the reference capacitance is adjusted based on the preset event, detection of an external object based on the grip sensor 330 may be at least temporarily stopped. The preset event for adjusting the reference capacitance may occur periodically along a preset period. The preset event is not limited to the above example. According to an embodiment, an operation of adjusting the reference capacitance by the grip sensor 330 will be described with reference to FIGS. 4 to 7. An example of a circuit included in the grip sensor 330 according to an embodiment will be described with reference to FIG. 8.

According to an embodiment, the temperature sensor 340 in the electronic device 101 may transmit sensor data including the temperature measured by the temperature sensor 340 to the grip sensor 330. The temperature sensor 340 may obtain a temperature of a part of the housing of the electronic device 101 on which the grip sensor 330 and/or the antenna 320 is disposed. Based on the obtained temperature, the grip sensor 330 may change the reference capacitance. According to an embodiment, an operation in which the grip sensor 330 in the electronic device 101 changes the reference capacitance based on the temperature sensor 340 will be described with reference to FIGS. 4 and/or 7.

According to an embodiment, the grip sensor 330 may transmit, to the processor 120 and/or the communication circuit 310, a signal indicating whether an external object contacting the electronic device 101 or approaching electronic device 101 has been detected. Transmission of the signal by the grip sensor 330 may be performed based on the capacitance measured by the grip sensor 330 and the reference capacitance while the grip sensor 330 is in the first state. The communication circuit 310 may reduce the strength of a signal wirelessly transmitted through the antenna 320 to a preset threshold or less, in response to identifying the grip by the external object or the external object approaching the electronic device 101 based on the signal. The communication circuit 310 may increase the strength of a signal wirelessly transmitted through the antenna 320 above the preset threshold, in response to identifying the release of the grip based on the signal, in response to identifying the release of the grip or that there is no external object less than the preset distance from the electronic device 101 based on the signal. For example, the communication circuit 310 may adjust the strength of the wireless signal emitted by the antenna 320 based on a signal, which is transmitted from the grip sensor 330, indicating whether an external object in contact with the electronic device 101 or approaching the electronic device 101 has been detected.

As described above, according to an embodiment, the grip sensor 330 in the electronic device 101 may compare the capacitance changed by an external object different from the electronic device 101 with the reference capacitance adjusted based on a preset period. Based on the comparison of the capacitance and the reference capacitance, the grip sensor 330 may detect the grip of the electronic device 101 or approach by the external object. The grip sensor 330 may adjust the reference capacitance based on the capacitance within a preset range related to the reference capacitance, while adjusting the reference capacitance based on a preset period. Since the grip sensor 330 adjusts the reference capacitance based on other factors (e.g., the preset range) along with the capacitance associated with the electric field formed in the outer space of the electronic device 101, rapid change in the reference capacitance may be prevented. Since the rapid change in the reference capacitance is prevented, the electronic device 101 may more accurately detect a grip of the electronic device 101 or an approach of an external object by using the grip sensor 330.

Hereinafter, referring to FIGS. 4 to 7, an operation of adjusting the reference capacitance by the grip sensor 330 based on an exemplary change in the capacitance of the grip sensor 330 and the reference capacitance will be described.

Figure 4:
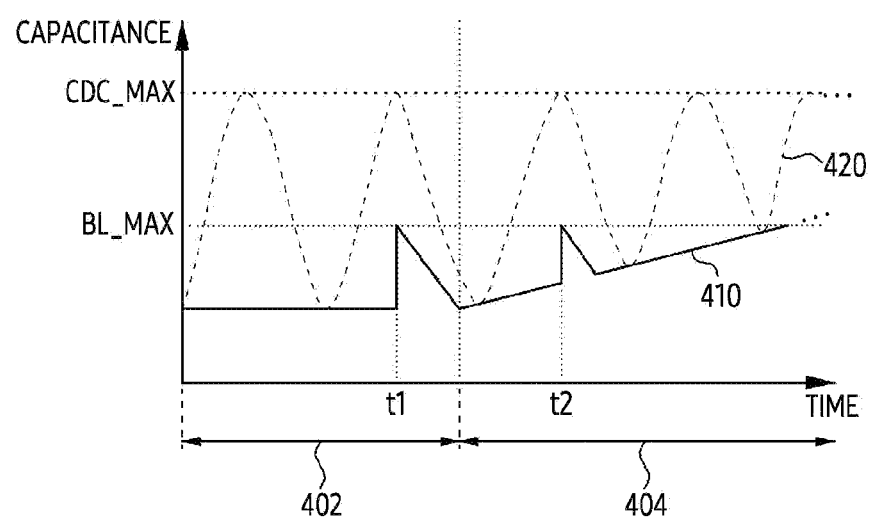
FIG. 4 is a graph illustrating an operation of a grip sensor in an electronic device, according to an embodiment.

FIG. 4 is graph illustrating an operation of a grip sensor in an electronic device. The electronic device of FIG. 4 may correspond to the electronic device 101 of FIGS. 1 to 3. For example, the grip sensor 330 of FIG. 3 may correspond to the grip sensor of FIG. 4.

The graph 410 of FIG. 4 may indicate reference capacitance, which is a parameter used by the grip sensor. The reference capacitance may be used by the grip sensor to detect a grip on the electronic device including the grip sensor or to detect an approach of an external object. The graph 420 of FIG. 4 may indicate capacitance measured by the grip sensor along a time axis coinciding with the graph 410. The capacitance indicated by the graph 420 may be related to an electric field formed in the external space of the electronic device including the grip sensor.

Referring to FIG. 4, the capacitance indicated by the graph 420 may be adjusted by an external object in contact with the electronic device. For example, the capacitance may be increased by contact with the external object. The capacitance measured by the grip sensor may be rapidly changed by the external object. For example, when the user repeatedly grabs the electronic device (e.g., with a hand), the capacitance may repeatedly increase or decrease rapidly. During contact with the external object, the capacitance indicated by the graph 420 may be increased to a maximum value (e.g., CDC_MAX). While the external object is spaced apart from the electronic device, the capacitance indicated by the graph 420 may be reduced again. For example, the capacitance may be reduced from the maximum value to the reference capacitance. For example, the reference capacitance may correspond to capacitance when no external object is in contact with the electronic device. In terms of the lower bound at which the capacitance is reduced, the graph 410 indicating the reference capacitance may be referred to as a baseline. The reference capacitance may be referred to as a baseline value.

According to an embodiment, the grip sensor may detect a grip on the electronic device 101 by an external object or an approach of the external object based on the reference capacitance changed as in graph 410 and the capacitance changed as in graph 420. For example, the grip sensor may detect a grip on the electronic device 101 or detect an approach of an external object in response to identifying capacitance exceeding the reference capacitance. For example, the grip sensor may detect the release of the grip on electronic device 101 or determine that the external object does not exist within the preset distance from electronic device 101, based on identifying that the capacitance matches the reference capacitance. For example, in a moment (or time point) in which the graphs 410 and 420 are matched with each other or in contact with each other, the grip sensor may transmit a signal indicating the release of the grip. A state in which the grip sensor detects a grip on the electronic device 101 based on reference capacitance and the capacitance may be referred to as a first state.

According to an embodiment, the grip sensor may enter a second state, which is different from the first state, for adjusting the reference capacitance from the first state. The grip sensor may change the state thereof from the first state to the second state based on a preset period. Referring to FIG. 4, in a time point t1 and a time point t2, the grip sensor may enter a second state for adjusting the reference capacitance. An interval between the time point t1 and the time point t2 may match or correspond to the preset period. The grip sensor may periodically change the reference capacitance to detect external objects adjacent to the electronic device more accurately by compensating for changes in capacitance according to changes in the environment including the electronic device. In such an embodiment, the grip sensor may be reset in the second state in which the grip sensor enters to adjust the reference capacitance.

In the second state in which the grip sensor adjusts the reference capacitance, when the reference capacitance matches the capacitance adjusted by the grip (or an external object adjacent to the electronic device), the accuracy of detecting the grip on the electronic device based on the reference capacitance may be reduced. The grip sensor according to an embodiment may change the reference capacitance independently of the capacitance rapidly changed by the grip. Since the reference capacitance is changed independently of the capacitance rapidly changed by the grip, the grip sensor can more accurately identify the grip on the electronic device. For example, in the second state, the grip sensor may adjust the reference capacitance based on at least one of a preset period, capacitance indicated by the graph 420, a preset threshold (e.g., BL_MAX in FIG. 4), or a temperature.

Referring to FIG. 4, according to an embodiment, the grip sensor may adjust the reference capacitance based on the capacitance indicated by the graph 420 within the second state after the time point t1. Since the reference capacitance is adjusted based on the capacitance and the reference capacitance indicated by the graph 410 after the time point t1 is less than the capacitance shown by the graph 420, the reference capacitance may be at least temporarily increased. According to an embodiment, the grip sensor may adjust the reference capacitance to be less than the preset threshold, based on identifying that the reference capacitance matches the preset threshold (e.g., BL_MAX in FIG. 4) or is adjusted above the preset threshold. Referring to FIG. 4, after the time point t1, the grip sensor may reduce the reference capacitance to less than the preset threshold based on identifying that the reference capacitance matches a preset threshold indicated by BL_MAX. For example, the grip sensor may reduce the reference capacitance not to be increased above the preset threshold based on the reference capacitance in the time point t1 entering the second state.

According to an embodiment, the grip sensor may change the state thereof from the second state to the first state after adjusting the reference capacitance to less than a preset threshold (e.g., BL_MAX) in the second state. For example, after entering the second state in the time point t1, the grip sensor may adjust a reference capacitance to a reference capacitance within the time point changed to the second state (e.g., the time point t1), in response to identifying that the reference capacitance is increased up to the preset threshold (e.g., BL_MAX). The grip sensor may change the state thereof from the second state to the first state based on the reference capacitance adjusted to the reference capacitance before entering the second state. Since the grip sensor changes the reference capacitance independently of the capacitance adjusted to the maximum value (CDC_MAX) by the grip on the electronic device in the time point t1, the grip sensor may more accurately detect a grip on the electronic device after the time point t1.

According to an embodiment, the grip sensor may adjust the reference capacitance indicated by the graph 410 based on the temperature. For example, in time interval 404 different from time interval 402, the grip sensor may gradually increase the reference capacitance based on a gradual increase in temperature detected by the temperature sensor (e.g., the temperature sensor 340 of FIG. 3). In the time point t2 within the time interval 404, the grip sensor may enter the second state from the first state. In the second state, the grip sensor may reduce the reference capacitance to the reference capacitance (e.g., a reference capacitance immediately before entering the second state) of the time point t2, based on the reference capacitance adjusted above the preset threshold (e.g., BL_MAX). Since the reference capacitance of the time point t2 is the reference capacitance adjusted by the temperature detected by the temperature sensor, the grip sensor may adjust the reference capacitance based on the reference capacitance and temperature at the time point (e.g., the time point t2) changing to the second state, in response to identifying that the reference capacitance is adjusted above the preset threshold.

As described above, according to an embodiment, the grip sensor may conditionally adjust the reference capacitance based on the preset threshold (e.g., BL_MAX in FIG. 4) within a preset state (e.g., the second state) changing the reference capacitance. For example, when the maximum value (e.g., CDC_MAX in FIG. 4) of the capacitance measured by the grip sensor is less than or equal to the preset threshold, the reference capacitance may be changed to the maximum value. For example, when the maximum value (e.g., CDC_MAX in FIG. 4) of capacitance measured by the grip sensor exceeds the preset threshold, the reference capacitance may be changed to be below the preset threshold. For example, the grip sensor may stop adjusting the reference capacitance based on the identification of the reference capacitance adjusted above the preset threshold. Since the grip sensor stops adjusting the reference capacitance, the reference capacitance may be restored to the reference capacitance before the preset state. For example, the grip sensor may detect a grip (or an external object adjacent to the electronic device) on the electronic device based on the restored reference capacitance. The grip sensor may maintain the reference capacitance as the restored reference capacitance for a preset period. Since the change in the reference capacitance due to the rapidly increased capacitance by the external object in contact with the electronic device is compensated, the electronic device may more accurately detect a grip on the electronic device by an external object or the external object approaching the electronic device using a grip sensor.

Figure 5:
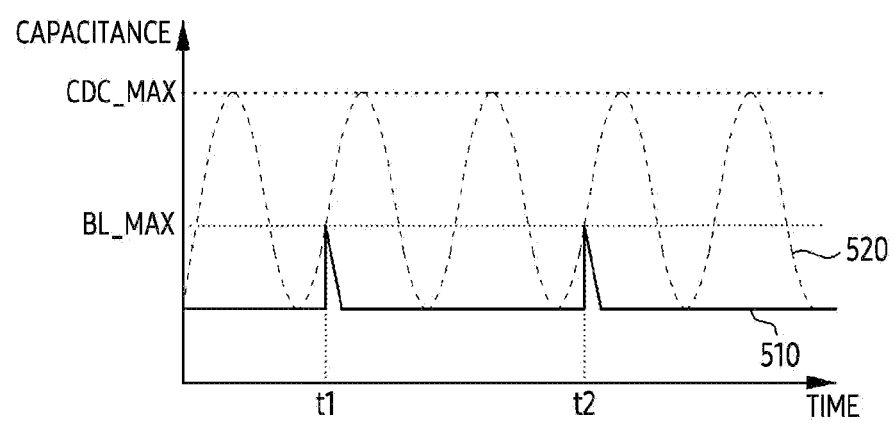
FIG. 5 is a graph illustrating an operation of a grip sensor in an electronic device, according to an embodiment.

FIG. 5 is a graph illustrating an operation of a grip sensor in an electronic device, according to an embodiment. The electronic device of FIG. 5 may correspond to the electronic device 101 of FIGS. 1 to 3, and/or the electronic device of FIG. 4. For example, the grip sensor 330 of FIG. 3 may correspond to the grip sensor of FIG. 5.

The graph 510 of FIG. 5 may indicate a reference capacitance compared with the capacitance measured by the grip sensor. The graph 520 of FIG. 5 may indicate a change in capacitance based on the time axis of the graph 510. According to an embodiment, the grip sensor may identify a grip on the electronic device including the grip sensor, or may identify an external object approaching the electronic device based on the difference between the capacitance indicated by the graph 520 and the reference capacitance indicated by the graph 510. The graphs 510 and 520 of FIG. 5 may be related to each of the graphs 410 and 420 of FIG. 4.

According to an embodiment, the grip sensor in the electronic device may use a preset threshold (BL_MAX) to prevent a rapid increase in reference capacitance (e.g., a rapid increase in reference capacitance due to the capacitance). Referring to FIG. 4, the preset threshold (BL_MAX) may be selected as a capacitance less than a maximum value (e.g., CDC_MAX) of the capacitance measured by the grip sensor. The preset threshold may be related to an upper limit of a range of detectable reference capacitance by the grip sensor in a state in which an external object in contact with the electronic device is not present.

According to an embodiment, the grip sensor may repeatedly change the reference capacitance. For example, the grip sensor may adjust the reference capacitance based on a preset period. Referring to FIG. 5, an example in which the grip sensor changes the reference capacitance in time points t1 and t2 is illustrated. In the time points t1 and t2, the grip sensor may adjust the reference capacitance based on the capacitance indicated by the graph 520. For example, based on the capacitance exceeding the reference capacitance, the grip sensor may increase the reference capacitance.

According to an embodiment, increasing the reference capacitance by the grip sensor may be performed within a range limited by the preset threshold (BL_MAX). For example, based on identifying that the reference capacitance increases above the preset threshold (BL_MAX), the grip sensor may stop increasing the reference capacitance. After stopping increasing the reference capacitance, the grip sensor may reduce the reference capacitance to be less than the preset threshold (BL_MAX). For example, the grip sensor may reduce the reference capacitance based on the reference capacitance before adjusting the reference capacitance. In the above example, the reference capacitance may be restored to the reference capacitance before being adjusted by the grip sensor.

As described above, according to an embodiment, the grip sensor in the electronic device may periodically adjust the reference capacitance to be compared with the capacitance to detect a grip (or an external object approaching the electronic device) on the electronic device more accurately based on capacitance. For example, the grip sensor may adjust the reference capacitance within a preset range based on the preset threshold (BL_MAX). For example, the grip sensor may adjust the reference capacitance based on the capacitance detected by the grip sensor within the preset range. Since the reference capacitance is adjusted based on the capacitance and the preset range, the grip sensor may prevent the reference capacitance from being adjusted by the capacitance changed by the grip on the electronic device. Since the reference capacitance is prevented from being adjusted by the capacitance changed by the grip, the grip sensor may more accurately identify an external object in contact with or approaching the electronic device based on the reference capacitance and the capacitance. Since the grip sensor more accurately identifies the external object, an increase in SAR due to the inaccurate operation of the grip sensor may be prevented.

Figure 6:
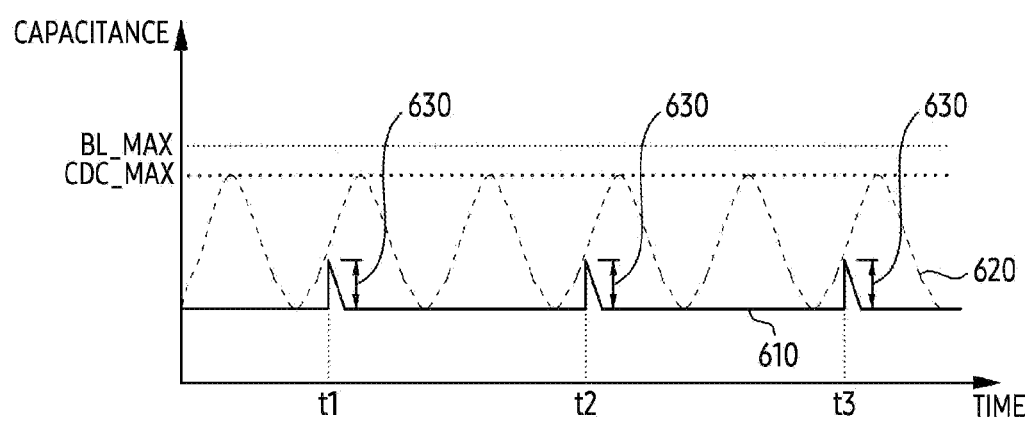
FIG. 6 is a graph illustrating an operation of a grip sensor in an electronic device, according to an embodiment.

FIG. 6 illustrates a graph illustrating an operation of a grip sensor in an electronic device, according to an embodiment. The electronic device of FIG. 6 may correspond to the electronic device 101 of FIGS. 1 to 3 and the electronic device of FIGS. 4 to 5. For example, the grip sensor 330 of FIG. 3 may include the grip sensor of FIG. 6.

The graph 610 of FIG. 6 may indicate a reference capacitance, which is a parameter used for driving the grip sensor. The graph 620 of FIG. 6 may indicate a capacitance measured by the grip sensor based on the time axis of the graph 610. Graphs 610 and 620 of FIG. 6 may be related to the graphs 410 and 420 of FIG. 4, respectively, or to the graphs 510 and 520 of FIG. respectively. According to an embodiment, the grip sensor may change upper limit of the range in which the reference capacitance is adjusted by comparing the maximum value (CDC_MAX) of the capacitance and the preset threshold (BL_MAX) used to adjust the reference capacitance. As shown in FIGS. 4 to 5, when the maximum value (CDC_MAX) exceeds the preset threshold (BL_MAX), the grip sensor may adjust the reference capacitance based on the preset threshold (BL_MAX). When the maximum value (CDC_MAX) is less than the preset threshold (BL_MAX), the grip sensor may adjust the reference capacitance based on a preset range to be less than the maximum value (CDC_MAX).

Referring to the graph 620 of FIG. 6, the maximum value (CDC_MAX) of capacitance measured by the grip sensor may be reduced below the preset threshold (BL_MAX) based on the characteristics of an external object approaching the electronic device. For example, in a case where a hand wearing gloves approaches an electronic device including a grip sensor, the maximum value (CDC_MAX) of capacitance measured by the grip sensor may be less than the maximum value of a capacitance measured by a hand without gloves. In this case, the maximum value (CDC_MAX) of the capacitance measured by the grip sensor may be less than the preset threshold (BL_MAX). In this case, the capacitance measured by the grip sensor when the hand wearing the glove contacts the electronic device may be less than the preset threshold (BL_MAX).

According to an embodiment, the grip sensor may prevent the reference capacitance from being adjusted to the maximum value (CDC_MAX) by adjusting the reference capacitance within the preset range 630 having an upper limit less than the maximum value (CDC_MAX), based on identifying that the maximum value (CDC_MAX) of capacitance is less than the preset threshold (BL_MAX). Referring to FIG. 6, at each of time points t1, t2, and t3 based on a preset period, the grip sensor may adjust the reference capacitance based on the preset range 630. The preset range 630 may have an upper limit less than the maximum value (CDC_MAX) of capacitance. For example, the upper limit of the preset range 630 may be a numeric value obtained by applying a preset ratio to the maximum value (CDC_MAX). The lower limit of the preset range 630 may be a reference capacitance immediately before the grip sensor adjusts the reference capacitance based on the capacitance.

Referring to FIG. 6, the grip sensor according to an embodiment may stop adjusting the reference capacitance based on identifying that the reference capacitance is adjusted to the upper limit of the preset range 630. According to an embodiment, the grip sensor may reduce the reference capacitance to less than the upper limit of the preset range 630 in response to identifying that the reference capacitance is increased up to the upper limit of the preset range 630. For example, the grip sensor may restore the reference capacitance to the reference capacitance before the time point t1 based on identifying that the reference capacitance is increased to the upper limit of the preset range 630, after increasing the reference capacitance from the time point t1. For example, the grip sensor may adjust the reference capacitance to the lower limit of the preset range 620. After restoring the reference capacitance, the grip sensor may compare the capacitance with the restored reference capacitance to identify a grip on the electronic device (or an external object approaching the electronic device). Identifying a grip on the electronic device based on the restored reference capacitance by the grip sensor may be performed up to a time point of adjusting the reference capacitance again based on a preset period.

As described above, according to an embodiment, the grip sensor in the electronic device may adjust the reference capacitance to be compared with the capacitance within a range less than the maximum value (CDC_MAX) of the capacitance. The range in which the reference capacitance is adjusted may be adjusted by a preset threshold (BL_MAX) and/or a preset range 630 having an upper limit less than the maximum value (CDC_MAX). According to an embodiment, the grip sensor may stop increasing the reference capacitance when identifying a reference capacitance that increases up to the preset threshold (BL_MAX) and/or the upper limit of the preset range 630. The grip sensor may restore the reference capacitance based on the reference capacitance before the reference capacitance is increased together with stopping increasing the reference capacitance. Since an approach of the external object or a grip on the electronic device by the external object is detected based on the restored reference capacitance, the grip sensor may prevent inaccurate detection of the external object due to a rapid increase in reference capacitance.

The capacitance detected by the grip sensor (e.g., the capacitance indicated by the graph 620) may be changed by various factors including the temperature of the grip sensor. Hereinafter, referring to FIG. 7, according to an embodiment, an operation in which the grip sensor adjusts the reference capacitance based on the change in the capacitance due to the temperature will be described.

Figure 7:
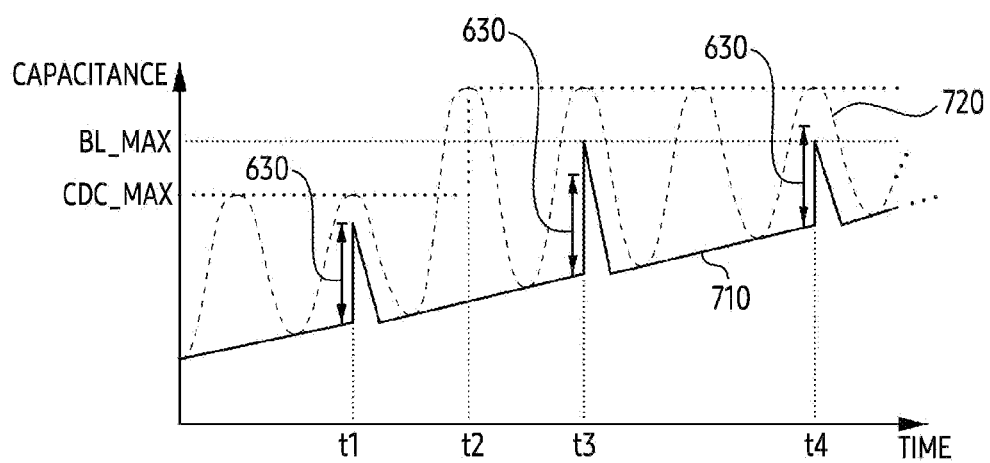
FIG. 7 is a graph illustrating an operation of a grip sensor in an electronic device, according to an embodiment.

FIG. 7 illustrates a graph illustrating an operation of a grip sensor in an electronic device, according to an embodiment. The electronic device of FIG. 7 may correspond to the electronic device 101 of FIGS. 1 to 3, and the electronic device of FIGS. 4 to 6. For example, the grip sensor 330 of FIG. 3 may include the grip sensor of FIG. 7.

Graph 710 of FIG. 7 may indicate a change in reference capacitance. The graph 720 of FIG. 7 may indicate a change in capacitance, which is measured by a grip sensor and compared with the reference capacitance, according to an embodiment. The graph 710 of FIG. 7 may be related (or corresponding) to the graph 410 of FIG. 4, the graph 510 of FIG. 5, and/or the graph 610 of FIG. 6. The graph 720 of FIG. 7 may be related to the graph 420 of FIG. 4, the graph 520 of FIG. 5, and/or the graph 620 of FIG. 6.

According to an embodiment, the grip sensor may adjust the reference capacitance based on the temperature detected by the temperature sensor (e.g., the temperature sensor 340 of FIG. 3). The temperature may be related to the temperature of the grip sensor. Adjusting the reference capacitance based on the temperature may be performed in a first state of detecting an external object that is in contact with or adjacent to the electronic device based on the capacitance and the reference capacitance. For example, the grip sensor may adjust the reference capacitance based on the temperature, independently of the first state and the second state of adjusting the reference capacitance. According to an embodiment, the grip sensor in the electronic device may adjust the reference capacitance in proportion to the temperature. Referring to the graph 710 of FIG. 7, as the temperature detected by the temperature sensor increases, the grip sensor may gradually increase the reference capacitance.

In an embodiment of adjusting the reference capacitance based on the temperature, the grip sensor may change a state thereof from a first state for detecting a grip (or an external object approaching the electronic device) on the electronic device based on a capacitance to a second state for adjusting the reference capacitance based on the capacitance. Referring to FIG. 7, in the time point t1, the grip sensor may change the state thereof to the second state. After the time point t1, the grip sensor entering the second state may adjust the reference capacitance based on at least one of the capacitance, a preset range 630 related to the maximum value of capacitance (CDC_MAX), and/or a preset threshold (BL_MAX) related to the reference capacitance. For example, after the time point t1, the grip sensor may adjust the reference capacitance within the preset range 630 having an upper limit less than a maximum value (CDC_MAX) based on capacitance with the maximum value (CDC_MAX) less than the preset threshold (BL_MAX). Referring to FIG. 7, based on identifying that the reference capacitance is adjusted above the upper limit of the preset range 630, the grip sensor may restore the reference capacitance to a reference capacitance before the time point t1.

After restoring the reference capacitance, the grip sensor may detect an external object contacting or approaching the electronic device based on the restored reference capacitance until the time point t3 after the time point t1. An interval between the time point t1 and the time point t3 may be a preset period for the grip sensor to periodically change the state of grip sensor to the second state. For example, in a time interval after the time point t1 and before the time point t3, the grip sensor may transmit a signal indicating that an external object has been detected, based on identifying capacitance above the reference capacitance. In the time interval, the grip sensor may transmit a signal (e.g., a signal indicating the release of the grip) indicating that the external object has not been detected based on identifying that the capacitance matches the reference capacitance. The signal may be transmitted to a communication circuit (e.g., the communication circuit 310 of FIG. 3) in the electronic device and/or a processor (e.g., the processor 120 of FIG. 3). For example, the communication circuit may adjust the strength and/or power of the wirelessly transmitted signal based on the signal transmitted from the grip sensor.

In the time point t3, the grip sensor may again enter the second state for adjusting the reference capacitance. Referring to FIG. 7, in the time point t2 before the time point t3, it is assumed that the maximum value (CDC_MAX) of the capacitance indicated by the graph 720 is increased above the preset threshold (BL_MAX). In the time point t3, the grip sensor in the second state may adjust the reference capacitance within a range having an upper limit that matches the preset threshold (BL_MAX) and having the reference capacitance within the time point t3 as a lower limit, based on identifying that the maximum value (CDC_MAX) of capacitance exceeds the preset threshold (BL_MAX). For example, the reference capacitance may be increased to a reference capacitance exceeding the preset range 630 and less than the preset threshold (BL_MAX).

Referring to FIG. 7, after the time point t3, based on identifying that the reference capacitance adjusted based on the second state is increased to the preset threshold (BL_MAX), the grip sensor according to an embodiment may restore the reference capacitance to a reference capacitance at the time point t3. After restoring the reference capacitance to the reference capacitance at the time point t3, the grip sensor may enter the first state from the second state. For example, a grip sensor may maintain detection of an external object in contact with or approaching the electronic device until the time point t4, based on the reference capacitance at the time point t3. An interval between the time point t4 and the time point t3 may match a preset period.

The grip sensor may enter the second state for adjusting the reference capacitance, based on the expiration of the preset period after the time point t3. Referring to FIG. 7, in the time point t4, the grip sensor may initiate adjusting the reference capacitance. The grip sensor may adjust the reference capacitance within a range less than or equal to the preset threshold (BL_MAX), based on identifying a capacitance having the maximum value (CDC_MAX) exceeding the preset threshold (BL_MAX) in the time point t4. Independently of the preset range 630 having the reference capacitance of moment t4 as the lower limit, the grip sensor may adjust the reference capacitance. After the time point t4, the grip sensor in the second state may adjust the reference capacitance based on the capacitance detected by the grip sensor within a range less than or equal to the preset threshold (BL_MAX). For example, after the time point t4, in case of identifying capacitance that is maintained below the preset threshold (BL_MAX) during the preset period, the grip sensor may adjust the reference capacitance to the identified capacitance. Referring to FIG. 7, when the reference capacitance is increased beyond the preset threshold (BL_MAX) by the capacitance detected by the grip sensor, the grip sensor may restore the reference capacitance to the reference capacitance at the time point t4.

Referring to FIG. 7, according to an embodiment, the grip sensor may adjust an upper limit for adjusting the reference capacitance based on the maximum value (CDC_MAX) of the capacitance of the time points t1, t3, and t4 changed to the second state for adjusting the reference capacitance. For example, such as the time point t1, when the maximum value (CDC_MAX) of capacitance is less than the preset threshold (BL_MAX), The grip sensor may limit the upper limit of the reference capacitance to the upper limit of the preset range 630 based on the reference capacitance. For example, such as the time point t3 and/or the time point t4, when the maximum value (CDC_MAX) of capacitance is greater than or equal to the preset threshold (BL_MAX), the grip sensor may limit the upper limit of the reference capacitance to the preset threshold (BL_MAX).

Although the operation of reducing the reference capacitance based on the reference capacitance at which the grip sensor has reached its upper limit has been described, but the embodiment is not limited thereto. For example, in the second state for adjusting the reference capacitance, the grip sensor may adjust the reference capacitance based on identifying that the capacitance increases within a range less than the maximum value (CDC_MAX) of the capacitance.

As described above, according to an embodiment, the grip sensor in the electronic device may adjust the reference capacitance based on at least one of a temperature, a preset threshold of the reference capacitance (BL_MAX), a maximum value of the capacitance detected by the grip sensor (CDC_MAX), or a preset range 630 having an upper limit less than the maximum value (CDC_MAX) and having the reference capacitance of a specific time point (e.g., a time point before switching to a second state) as a lower limit. Since the grip sensor additionally uses at least one of the temperature, the preset threshold (BL_MAX), the maximum value (CDC_MAX), or the preset range 630 together with the capacitance, the grip sensor may more accurately detect a grip on an electronic device by an external object or the external object approaching the electronic device.

Hereinafter, a circuit of a grip sensor in an electronic device according to an embodiment will be described with reference to FIG. 8.

Figure 8:
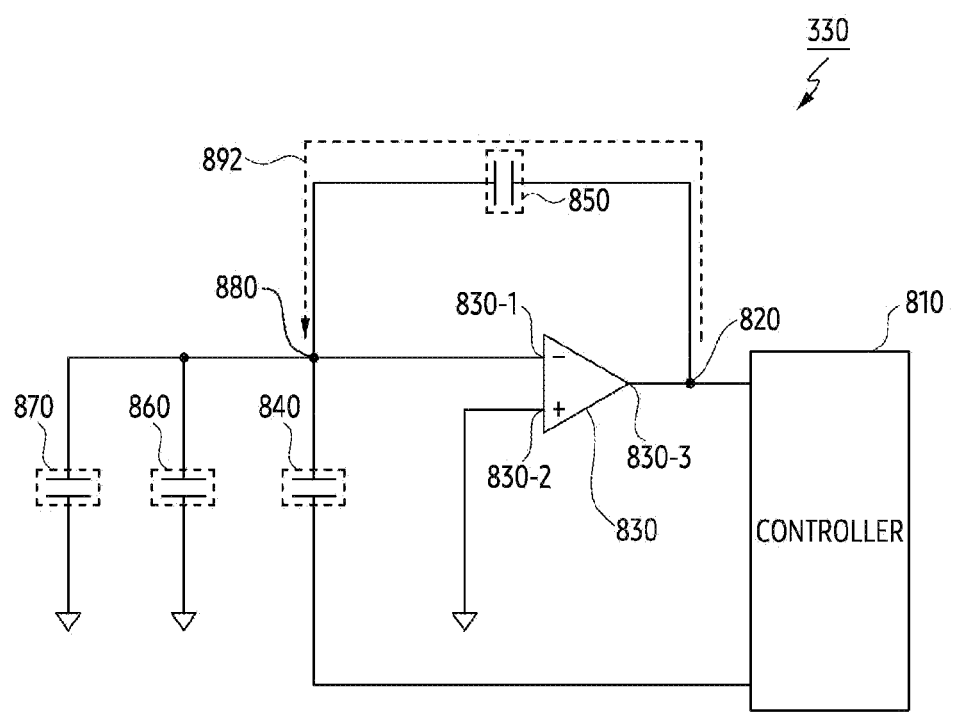
FIG. 8 is a schematic circuit diagram illustrating a grip sensor in an electronic device according to an embodiment.

FIG. 8 illustrates a schematic circuit diagram illustrating a grip sensor 330 in an electronic device according to an embodiment. The electronic device of FIG. 8 may correspond to the electronic device 101 of FIGS. 1 to 3, and the electronic device of FIGS. 4 to 5. For example, the grip sensor 330 of FIG. 3 may include the grip sensor of FIG. 6.

Referring to FIG. 8, the grip sensor 330 according to an embodiment may include a controller 810 connected to a node 820. The grip sensor 330 may include a comparator 830 including an output end 830-3 connected to the node 820, a grounded non-inverting input end 830-2, and an inverting input terminal 830-1 connected to the node 880. The grip sensor 330 may include a capacitor 840 including one end connected to the controller 810 and the other end connected to the node 880. The grip sensor 330 may include a capacitor 850 including one end connected to the node 820 and the other end connected to the node 880. The grip sensor 330 may include a capacitor 860 including one end connected to the node 880 and the other end grounded.

Referring to FIG. 8, a capacitance changed by an external object (e.g., the external object 220 of FIG. 2) detected by the grip sensor 330 may be modeled, based on the capacitor 870 including one end grounded and the other end connected to the node 880. For example, when an external object in contact with the electronic device does not exist, the capacitor 870 may be separated from the node 880. For example, when an external object is in contact with the electronic device, the capacitor 870 may be connected to the node 880, or the capacitance of the capacitor 870 may be adjusted according to the characteristics of the external object and/or the distance between the external object and the electronic device.

According to an embodiment, the capacitance of the capacitor 850 may be related to the sensitivity of the grip sensor 330 and/or a signal-to-noise ratio (SNR). The controller 810 of the grip sensor 330 may charge the capacitor 840 based on the reference capacitance. The charge in the capacitor 840 charged by the reference capacitance may be transmitted to the capacitor 860 to charge the capacitor 860. When the external object in contact with the electronic device does not exist, the exchange of charges between the capacitors 840, 850, and 860 may be stopped as the charging of the capacitor 860 is completed. Since the exchange of charges is stopped, the voltage of the node 820 detected by the controller 810 may be maintained constant. Based on the voltage of the node 820 maintained constant, the controller 810 of the grip sensor 330 may identify that the grip by the external object has been released. For example, the controller 810 may detect a grip on the electronic device or an external object approaching the electronic device based on the voltage and/or current of the node 820.

In such an embodiment, contact of the external object on the electronic device may be modeled as a connection between the capacitor 870 and the node 880. A current flow for charging the capacitor 870 may be generated by the capacitor 870 connected to the node 880. The flow of the current may cause a flow of current flowing from the node 820 to the node 880 through the capacitor 850. Referring to FIG. 8, after the external object contacts the electronic device, a current flowing along the direction 892 may be generated. The controller 810 in the grip sensor 330 may identify a voltage of the node 820 increased by the current flowing along the direction 892. Based on the increased voltage, the controller 810 may detect an external object contacting the electronic device or adjacent to the electronic device.

According to an embodiment, the controller 810 in the grip sensor 330 may obtain a digital value (e.g., capacitance digital code (CDC)) indicating a voltage of the node 820. The digital value may indicate a capacitance adjusted by an electric field formed in an external space of the electronic device, like the graph 420 of FIG. 4, the graph 520 of FIG. 5, the graph 620 of FIG. 6, and/or the graph 720 of FIG. 7. According to an embodiment, the grip sensor 330 may adjust the digital value based on the reference capacitance. The adjusted digital value may be used to detect an external object contacting the electronic device or approaching the electronic device. For example, the digital value may indicate a difference between the capacitance and the reference capacitance. The controller 810 may generate a signal indicating whether the external object has been detected based on the digital value. According to an embodiment, the controller 810 in the grip sensor 330 may more accurately detect the external object by adjusting the reference capacitance based on the above-described operation with reference to FIGS. 2 to 7.

Hereinafter, operations of the grip sensor 330 and/or the controller 810 according to an embodiment will be described with reference to FIGS. 9 to 11.

Figure 9:
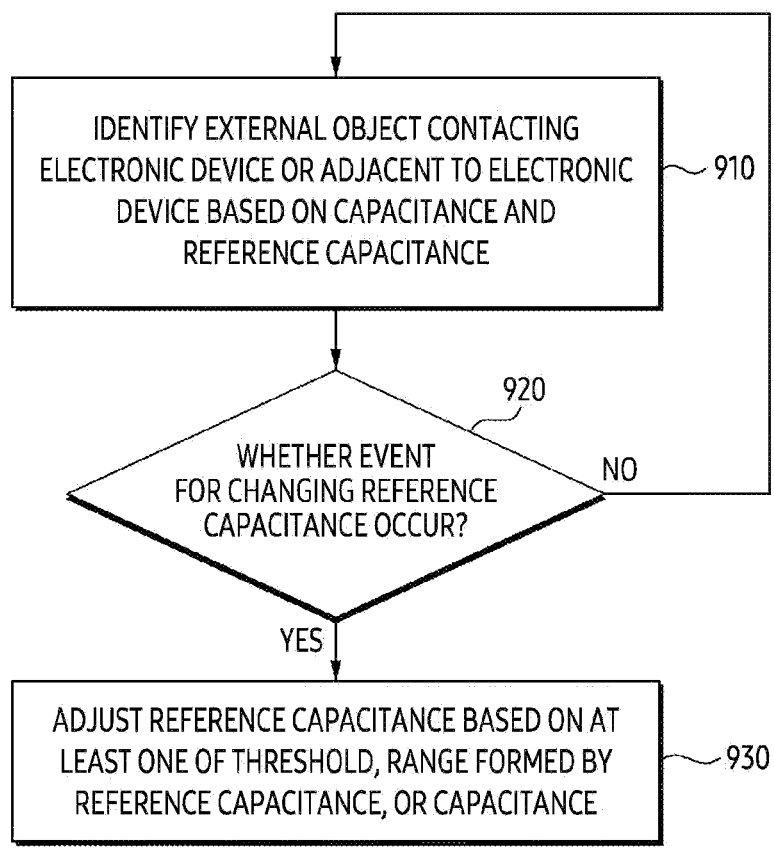
FIG. 9 is a flowchart illustrating a process of controlling a grip sensor by an electronic device, according to an embodiment.

FIG. 9 is a flowchart illustrating a process of controlling a grip sensor by an electronic device, according to an embodiment. The electronic device of FIG. 9 may correspond to the electronic device 101 of FIGS. 1 to 3, and the electronic device of FIGS. 4 to 8. For example, the grip sensor 330 of FIG. 3 may include the grip sensor of FIG. 9. At least one of the operations of FIG. 9 may be performed by the grip sensor 330 of FIG. 3 or 8, and/or the controller 810 of FIG. 8.

Referring to FIG. 9, in operation 910, a grip sensor according to an embodiment may identify an external object that is in contact with or adjacent to electronic device based on capacitance and reference capacitance. For example, the grip sensor may identify a grip on the electronic device based on the capacitance and the reference capacitance. The grip sensor may output a signal indicating a result of identifying the grip. The signal may be transmitted to another circuit connected to the grip sensor (e.g., the communication circuit 310, the processor 120, and/or the memory 130 of FIG. 3). The grip sensor may perform the operation 910 in a first state. For example, the grip sensor may identify a grip on the electronic device or identify an external object approaching the electronic device, based on identifying capacitance exceeding the reference capacitance, in the first state. The grip sensor may identify that the grip is released or determine that the external object has not been detected based on identifying that the capacitance matches the reference capacitance, in the first state. An operation of identifying an external object that is in contact with or approaching to electronic device by the electronic device based on operation 910 will be described with reference to FIG. 10.

Referring to FIG. 9, in operation 920, according to an embodiment, the grip sensor may determine whether an event for changing the reference capacitance has occurred. The event may cause an entry from a first state for performing operation 910 to a second state for changing the reference capacitance. The event may be repeatedly generated based on a preset period. Before the event is generated (920—NO), the grip sensor may perform operation 910 based on the first state.

In operation 930, according to an embodiment, when an event for changing the reference capacitance occurs (920—YES), the grip sensor may adjust the reference capacitance based on at least one of a threshold, a range formed by (e.g., set based on) the reference capacitance, or a capacitance. Based on the occurrence of the event, the grip sensor may change the state thereof from the first state performing operation 910 to the second state performing operation 930. The threshold may include an upper limit for adjusting the reference capacitance, as the preset threshold (BL_MAX) of FIGS. 4 to 7. The range formed by the reference capacitance may include a range for maintaining the reference capacitance less than a maximum value (e.g., a maximum value (CDC_MAX) of FIGS. 4 to 7) of the capacitance detected by the grip sensor, as the preset range 630 of FIGS. 6 to 7. In operation 930, the grip sensor according to an embodiment may adjust the reference capacitance within the range. For example, based on identifying that the reference capacitance increases up to the upper limit of the preset range, the grip sensor may reduce the reference capacitance to be below the upper limit. An operation of adjusting the reference capacitance by the electronic device based on operation 930 will be described with reference to FIG. 11.

After operation 930, based on the reference capacitance adjusted by operation 930, the grip sensor may identify a grip on the electronic device or identify an external object approaching the electronic device by performing operation 910 again. For example, while the grip sensor is activated, the grip sensor may repeatedly perform operations 910, 920, and 930 of FIG. 9.

Figure 10:
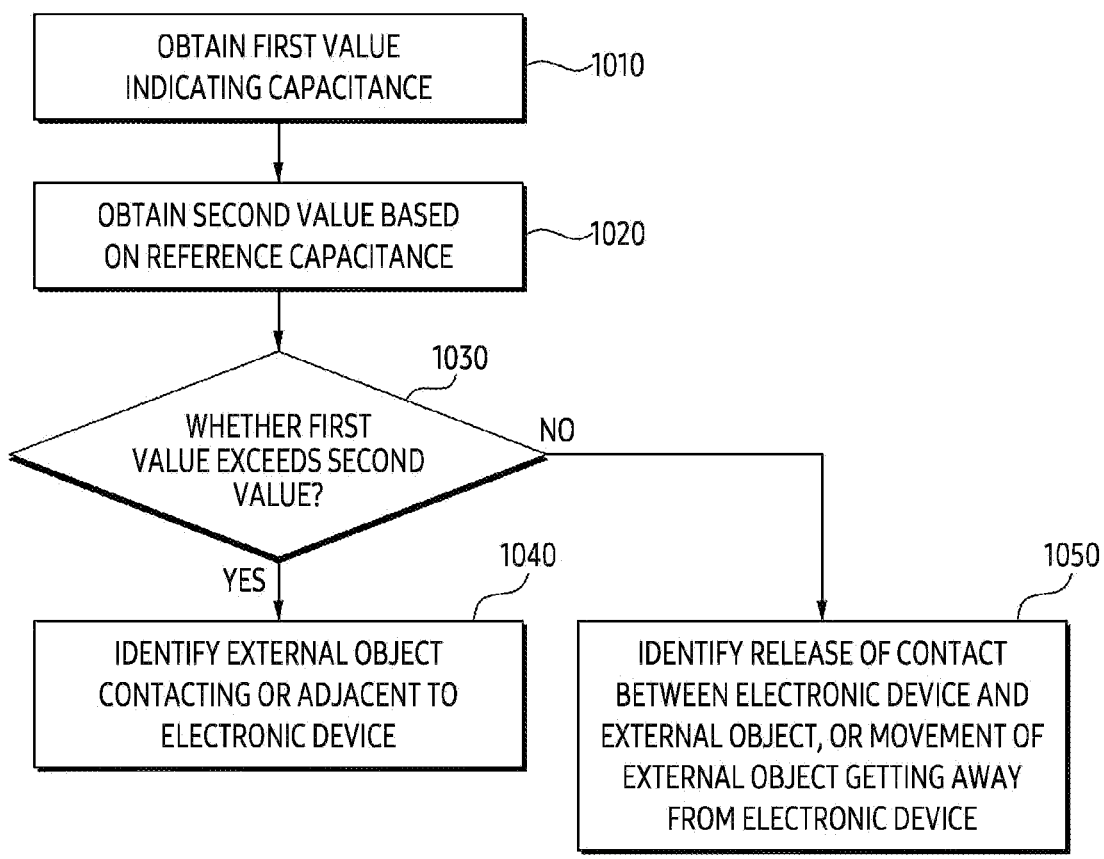
FIG. 10 is a flowchart illustrating a process of controlling a grip sensor by an electronic device, according to an embodiment.

FIG. 10 is a flowchart illustrating a process of controlling a grip sensor by an electronic device, according to an embodiment. The electronic device of FIG. 10 may correspond to the electronic device 101 of FIGS. 1 to 3, and the electronic device of FIGS. 4 to 9. For example, the grip sensor 330 of FIG. 3 may include the grip sensor of FIG. 10. At least one of the operations of FIG. 10 may be performed by the grip sensor 330 of FIG. 3 or 8, and/or the controller 810 of FIG. 8. At least one of the operations of FIG. 10 may be related to operation 910 of FIG. 9.

Referring to FIG. 10, in operation 1010, the grip sensor according to an embodiment may obtain a first value indicating capacitance. The first value may indicate capacitance on the graph 420 of FIG. 4, the graph 520 of FIG. 5, the graph 620 of FIG. 6, and/or the graph 720 of FIG. 7. According to an embodiment, the grip sensor may obtain the first value based on the voltage and/or current of the node 820 of FIG. 8.

Referring to FIG. 10, in operation 1020, the grip sensor according to an embodiment may obtain a second value based on the reference capacitance. The second value may be adjusted by the temperature of the grip sensor at a time point which has obtained the first value of operation 1010. The second value may correspond to the reference capacitance on the graph 410 of FIG. 4, the graph 510 of FIG. 5, the graph 610 of FIG. 6, and/or the graph 710 of FIG. 7. The second value of operation 1020 may be periodically adjusted based on operation 930 of FIG. 9, which is periodically performed by the grip sensor.

Referring to FIG. 10, in operation 1030, the grip sensor according to an embodiment may determine whether the first value exceeds the second value. For example, the grip sensor may detect a grip on the electronic device by comparing the first value of operation 1010 and the second value of operation 1020. For example, in operation 1040, when the first value exceeds the second value (1030—YES), the grip sensor according to an embodiment may identify an external object contacting or adjacent to the electronic device. For example, the grip sensor may detect a grip on an electronic device. In operation 1040, based on detecting a grip on the electronic device, the grip sensor may transmit a signal notifying detection of the grip. In operation 1040, based on identifying an external object adjacent to the electronic device, the grip sensor may transmit a signal notifying the identification of the external object. For example, in operation 1050, when the first value is less than or equal to the second value (1030—NO), the grip sensor according to an embodiment may detect or identify a release of contact between the electronic device and the external object (e.g., a release of the grip), or movement of the external object getting or being away from the electronic device. Based on detecting the release or the movement of the external object getting or being away, the grip sensor may transmit a signal notifying the release of the grip. For example, based on detecting the movement of the external object getting or being away, the grip sensor may transmit a signal indicating the movement of the external object getting or being away.

Figure 11:
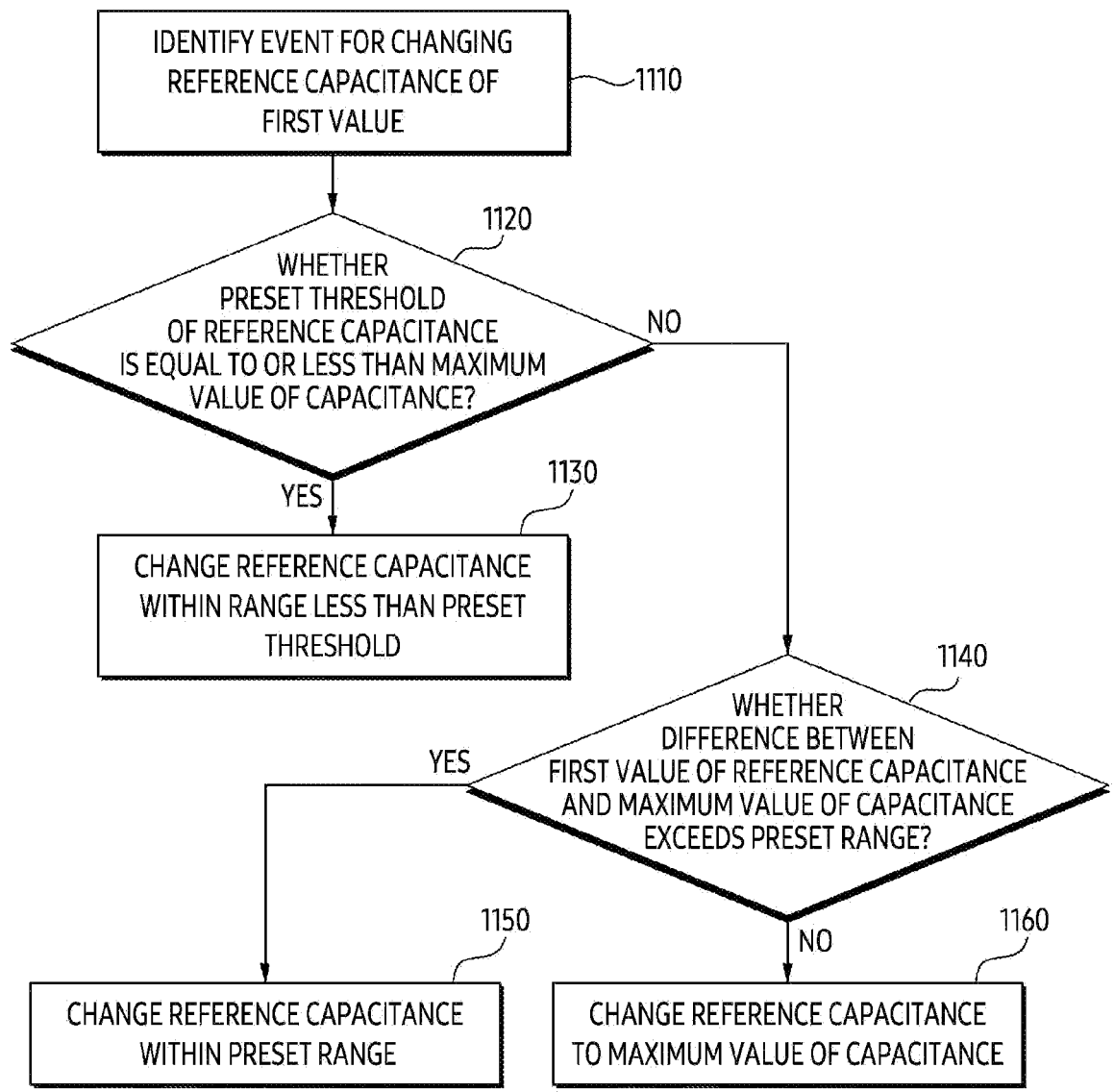
FIG. 11 is a flowchart illustrating a process of controlling a grip sensor by an electronic device, according to an embodiment.

FIG. 11 is a flowchart illustrating a process of controlling a grip sensor by an electronic device, according to an embodiment. The electronic device of FIG. 11 may correspond to the electronic device 101 of FIGS. 1 to 3, and the electronic device of FIGS. 4 to 10. For example, the grip sensor 330 of FIG. 3 may include the grip sensor of FIG. 9. At least one of the operations of FIG. 11 may be performed by the grip sensor 330 of FIG. 3 or 8, and/or the controller 810 of FIG. 8. At least one of the operations of FIG. 11 may be related to at least one of the operations 920 and 930 of FIG. 9.

Referring to FIG. 11, in operation 1110, the grip sensor according to an embodiment may identify an event for changing the reference capacitance of the first value. For example, the grip sensor may perform operation 1110 similar to operation 920 of FIG. 9.

In operation 1120, based on identifying the event of operation 1110, the grip sensor according to an embodiment may determine whether the preset threshold of the reference capacitance is equal to or less than the maximum value of the capacitance. For example, the grip sensor may compare the preset threshold and the maximum value. The preset threshold of the reference capacitance may include the preset threshold (BL_MAX) of FIGS. 4 to 7. The maximum value of the capacitance may include a maximum value of the capacitance (e.g., the maximum value (CDC_MAX) of FIGS. 4 to 7) identified by the grip sensor performing operation 1120.

In operation 1130, when the preset threshold is less than or equal to the maximum value of capacitance (1120—YES), the grip sensor according to an embodiment may change the reference capacitance within a range less than a preset threshold. For example, the reference capacitance may be changed from the first value to a second value less than the preset threshold based on operation 1130. In operation 1130, the grip sensor may adjust (or change) the reference capacitance based on the capacitance detected by the grip sensor within a range less than the preset threshold. When the reference capacitance is adjusted beyond the range below the preset threshold based on the capacitance, the grip sensor may restore the reference capacitance to the first value. For example, the reference capacitance adjusted by the grip sensor performing operation 1130 of FIG. 11 may be adjusted as in the graph 410 of FIG. 4 and/or the graph 510 of FIG. 5.

In operation 1140, when the preset threshold exceeds the maximum value of capacitance (1120—NO), the grip sensor according to an embodiment may determine whether the difference between the first value of the reference capacitance and the maximum value of the capacitance exceeds the preset range. The upper limit of the preset range may be less than the maximum value. In operation 1140, the grip sensor may compare the first value of the reference capacitance of the time point identifying the event of operation 1110 with the maximum value of the capacitance.

In operation 1150, when the difference between the first value and the maximum value exceeds the preset range (1140—YES), the grip sensor according to an embodiment may change the reference capacitance within the preset range. In operation 1150, since the upper limit of the preset range is less than the maximum value of the capacitance, the reference capacitance may be adjusted within the preset range less than the maximum value of the capacitance. In operation 1150, when the reference capacitance is increased up to the upper limit of the preset range, the grip sensor may adjust the reference capacitance to the first value of operation 1110. For example, the reference capacitance adjusted by the grip sensor performing operation 1150 of FIG. 11 may be adjusted as shown in graph 610 of FIG. 6.

In operation 1160, when the difference between the first value and the maximum value is less than or equal to the preset range (1140—NO), the grip sensor according to an embodiment may change the reference capacitance to a maximum value of the capacitance. For example, in operation 1160, the reference capacitance may be adjusted to a maximum value of the capacitance included in a preset range below the preset threshold. Referring to FIG. 11, adjustment by a grip sensor that adjusts the reference capacitance to the maximum value of the capacitance detected by the grip sensor may be limited to cases where the maximum value is included in the preset range less than the preset threshold related to the reference capacitance, as in operation 1160. In a case different from the above case, the grip sensor may prevent reference capacitance from being increased to a maximum value of the capacitance based on the preset threshold and/or the preset range.

As described above, according to an embodiment, the grip sensor in the electronic device may detect the grip on the electronic device by comparing the capacitance based on the electric field formed in the external space with the reference capacitance. The grip sensor may prevent the reference capacitance from rapidly increasing based on the maximum value of the capacitance within a state (e.g., the second state) that adjusts the reference capacitance. Since the grip sensor prevents a rapid increase in reference capacitance, the grip sensor may more accurately detect a grip on the electronic device based on the reference capacitance.

In an electronic device including a grip sensor for detecting an external object in contact with or adjacent to the electronic device, a method for more accurately detecting the external object using the grip sensor may be desired. As described above, according to an embodiment, an electronic device may comprise a grip sensor which detects a grip on the electronic device, and a communication circuitry operably coupled to the grip sensor. The grip sensor may be configured to transmit a signal indicating whether the grip is detected to the communication circuitry in a first state for detecting the grip, based on a capacitance changed by the grip and a reference capacitance. The grip sensor may be configured to adjust the reference capacitance based on the capacitance in a second state, which is different from the first state, for adjusting the reference capacitance. The grip sensor may be in one of the first state and the second state (e.g., alternatively in the first state and the second state). The grip sensor may be configured to adjust the reference capacitance to be lower than the preset threshold, based on identifying that the reference capacitance is adjusted to be greater than or equal to a preset threshold. The electronic device according to an embodiment can more accurately detect the external object by using a grip sensor which detects an external object in contact with or adjacent to the electronic device.

For example, the grip sensor may be configured to adjust, based on identifying that the reference capacitance is adjusted to be greater than or equal to the preset threshold, the reference capacitance based on the reference capacitance in a time point when a state of the grip sensor is changed to the second state.

For example, the grip sensor may be configured to adjust, based on identifying that the capacitance has a maximum value lower than the preset threshold, the reference capacitance based on a preset range lower than the preset threshold.

For example, the electronic device may further comprise a temperature sensor. The grip sensor may be configured to adjust the reference capacitance based on a temperature detected by the temperature sensor.

For example, the grip sensor may be configured to adjust, based on identifying that the reference capacitance is adjusted to be greater than or equal to the preset threshold, the reference capacitance based on the temperature and a reference capacitance in a time point when a state of the grip sensor is changed to the second state.

For example, the grip sensor may be configured to change from the first state to the second state based on a preset period.

For example, the grip sensor may be configured to change, after adjusting the reference capacitance to be lower than the preset threshold in the second state, to the first state from the second state.

For example, the grip sensor may be configured to transmit, based on identifying that the capacitance is greater than the reference capacitance in the first state, the signal indicating that the grip is detected. The grip sensor may be configured to transmit, based on identifying that the capacitance matches the reference capacitance, the signal indicating that a release of the grip is detected.

For example, the electronic device may further comprise an antenna. The communication circuitry in the electronic device may be configured to adjust, based on the signal transmitted from the grip sensor, a strength of a wireless signal transmitted or emitted from the antenna.

For example, the grip sensor may be configured to detect, based on a difference between the capacitance and the reference capacitance, the grip or the release of the grip.

As described above, according to various embodiments, a method for controlling a grip sensor in an electronic device may comprise detecting the grip based on a capacitance adjusted by the grip and a reference capacitance, in a first state for detecting a grip on the electronic device. The method may comprise adjusting the reference capacitance based on the capacitance within a second state, which is different from the first state, for adjusting the reference capacitance. The method may comprise adjusting the reference capacitance to be lower than the preset threshold, based on identifying that the reference capacitance is adjusted to be greater than or equal to a preset threshold.

For example, the adjusting the reference capacitance to be lower than the preset threshold may further comprise adjusting, based on the reference capacitance in a time point when a state of the grip sensor is changed to the second state, the reference capacitance.

For example, the method may further comprise adjusting, based on identifying that the capacitance has a maximum value lower than the preset threshold in the second state, the reference capacitance based on a preset range lower than the preset threshold.

For example, the method may further comprise adjusting the reference capacitance based on a temperature detected by a temperature sensor in the electronic device.

For example, the method may further comprise changing a state of the grip sensor from the first state to the second state based on a preset period.

For example, the adjusting the reference capacitance to be lower than the preset threshold may further comprise changing, after adjusting the reference capacitance to be lower than the preset threshold, a state of the grip sensor to the first state from the second state.

For example, the detecting the grip may comprise detecting the grip based on identifying that the capacitance is greater than the reference capacitance. For example, the method may comprise detecting a release of the grip based on identifying that the capacitance matches the reference capacitance.

As described above, according to various embodiments, an electronic device may comprise a grip sensor which detects a grip on the electronic device, an antenna, and a communication circuitry for adjusting a strength of a wireless signal transmit by the antenna based on the grip detected by the grip sensor. The grip sensor may be configured to detect the grip by comparing a capacitance changed by an external object different from the electronic device to a reference capacitance adjusted based on a preset period. The grip sensor may be configured to adjust the reference capacitance based on the capacitance in a preset range associated with the reference capacitance, while adjusting the reference capacitance based on the preset period.

For example, the grip sensor may be configured to increase, based on identifying that the capacitance is increased, the reference capacitance based on an increased capacitance. the grip sensor may be configured to stop increasing the reference capacitance based on identifying that the reference capacitance is increased to be greater than the preset range.

For example, the grip sensor may be configured to adjust the reference capacitance based on at least one selected from a preset threshold and a temperature.

According to various embodiments, an electronic device may comprise a grip sensor which detects a grip on the electronic device based on a reference capacitance, and a communication circuitry operably coupled to the grip sensor. The grip sensor may be configured to transmit, in a first time section, a signal for indicating a grip on the electronic device based on a capacitance of a capacitor charged by a first reference capacitance. The grip sensor may be configured to adjust, in a second time section different from the first time section, the first reference capacitance to a second reference capacitance corresponding to the capacitance that is increased by the grip. The grip sensor may be configured to adjust, in the second time section, the second capacitance to the first reference capacitance based on identifying that the capacitance exceeds to a preset range associated with the first reference capacitance or is increased to be greater than a preset threshold.

According to various embodiments, an electronic device may comprise a grip sensor including a capacitor and a controller for detecting a grip on the electronic device based on a capacitance of the capacitor and a communication circuitry operably coupled to the grip sensor. The controller of the grip sensor may be configured to identify a reference capacitance based on the capacitance identified in a first time section. The controller of the grip sensor may be configured to, in a second time section after the first time section, transmit, to the communication circuitry, a signal regarding the grip that is detected based on the capacitor charged by the identified reference capacitor. The reference capacitance is identified based on at least one of a maximum value of the capacitance in the first time section, a range associated with the capacitance identified in a beginning moment of the first time section and a preset threshold capacitance.

The apparatus or electronic device described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device, comprising,
a grip sensor which detects a grip on the electronic device; and
a communication circuitry operably coupled to the grip sensor,
wherein the grip sensor is configured to:
transmit, to the communication circuitry in a first state for detecting the grip, a signal indicating whether the grip is detected, based on a capacitance changed by the grip and a reference capacitance;
adjust, in a second state, which is different from the first state, for adjusting the reference capacitance, the reference capacitance based on the capacitance; and
adjust, based on identifying that the reference capacitance is adjusted to be greater than or equal to a preset threshold, the reference capacitance to be lower than the preset threshold.

2. The electronic device of claim 1, wherein the grip sensor is configured to:
adjust, based on identifying that the reference capacitance is adjusted to be greater than or equal to the preset threshold, the reference capacitance based on the reference capacitance in a time point when a state of the grip sensor is changed to the second state.

3. The electronic device of claim 1, wherein the grip sensor is configured to:
adjust, based on identifying the capacitance having a maximum value lower than the preset threshold, the reference capacitance based on a preset range lower than the preset threshold.

4. The electronic device of claim 1, further comprising a temperature sensor, and wherein the grip sensor is configured to adjust the reference capacitance based on a temperature detected by the temperature sensor.

5. The electronic device of claim 4, wherein the grip sensor is configured to:
adjust, based on identifying that the reference capacitance is adjusted to be greater than or equal to the preset threshold, the reference capacitance based on the temperature and a reference capacitance in a time point when a state of the grip sensor is changed to the second state.

6. The electronic device of claim 1, wherein the grip sensor is configured to:
change from the first state to the second state based on a preset period.

7. The electronic device of claim 1, wherein the grip sensor is configured to:
change, after adjusting the reference capacitance to be lower than the preset threshold in the second state, to the first state from the second state.

8. The electronic device of claim 1, wherein the grip sensor is configured to:
transmit, based on identifying the capacitance greater than the reference capacitance in the first state, the signal indicating that the grip is detected; and
transmit, based on identifying the capacitance matched to the reference capacitance, the signal indicating that a release of the grip is detected.

9. The electronic device of claim 8, further comprising an antenna, and wherein the communication circuitry is configured to:
adjust, based on the signal transmitted from the grip sensor, a strength of a wireless signal emitted from the antenna.

10. The electronic device of claim 8, wherein the grip sensor is configured to:
detect, based on a difference between the capacitance and the reference capacitance, the grip or the release of the grip.

11. A method for controlling a grip sensor in an electronic device, the method comprising:
detecting, in a first state for detecting a grip on the electronic device, the grip based on a capacitance adjusted by the grip and a reference capacitance;
adjusting, in a second state, which is different from the first state, for adjusting the reference capacitance and is different from the first state, the reference capacitance based on the capacitance; and
adjusting, based on identifying that the reference capacitance is adjusted to be greater than or equal to a preset threshold, the reference capacitance to be lower than the preset threshold.

12. The method of claim 11, wherein the adjusting the reference capacitance to be lower than the preset threshold further comprising:
adjusting, based on the reference capacitance in a time point when a state of the grip sensor is changed to the second state, the reference capacitance.

13. The method of claim 11, further comprising:
adjusting, based on identifying that the capacitance has a maximum value lower than the preset threshold in the second state, the reference capacitance based on a preset range lower than the preset threshold.

14. The method of claim 11, further comprising:
adjusting the reference capacitance based on a temperature detected by a temperature sensor in the electronic device.

15. The method of claim 11, further comprising:
changing a state of the grip sensor from the first state to the second state based on a preset period.

16. The method of claim 11, wherein the adjusting the reference capacitance to be lower than the preset threshold further comprising:

changing, after adjusting the reference capacitance to be lower than the preset threshold, a state of the grip sensor to the first state from the second state.

17. The method of claim 11, wherein the detecting the grip comprising:
   detecting the grip based on identifying that the capacitance is greater than the reference capacitance; and
   detecting a release of the grip based on identifying that the capacitance matches the reference capacitance.

18. An electronic device, comprising:
   a grip sensor which detects a grip on the electronic device;
   an antenna; and
   a communication circuitry which adjusts a strength of a wireless signal transmit by the antenna based on the grip detected by the grip sensor;
   wherein the grip sensor is configured to:
   detect the grip by comparing a capacitance changed by an external object different from the electronic device to a reference capacitance adjusted based on a preset period;
   adjust, while adjusting the reference capacitance based on the preset period, the reference capacitance based on the capacitance in a preset range associated with the reference capacitance.

19. The electronic device of claim 18, wherein the grip sensor is configured to:
   increase, based on identifying that the capacitance is increased, the reference capacitance based on an increased capacitance; and
   stop increasing the reference capacitance based on identifying that the reference capacitance is increased to be greater than the preset range.

20. The electronic device of claim 18, wherein the grip sensor is configured to:
   adjust the reference capacitance based on at least one of a preset threshold or a temperature.

* * * * *